United States Patent [19]

Barrera

[11] Patent Number: 4,901,433

[45] Date of Patent: Feb. 20, 1990

[54] DEVICE FOR INSERTING A PLURALITY OF PHASE INSULATORS IN THE CAVITIES OF THE STATOR OF A DYNAMO-ELECTRIC MACHINE

[75] Inventor: Giorgio Barrera, Leumann-Collegno, Italy

[73] Assignee: Officine Meccanishe Pavesi & C. S.p.A., Turin, Italy

[21] Appl. No.: 211,012

[22] Filed: Jun. 24, 1988

[30] Foreign Application Priority Data

Mar. 4, 1988 [IT]  Italy .................................. 67178 A/88

[51] Int. Cl.⁴ ............................................ H02K 15/06
[52] U.S. Cl. ........................................ 29/734; 29/596; 29/736
[58] Field of Search ................. 29/732, 734, 736, 596, 29/598, 606

[56]  References Cited

U.S. PATENT DOCUMENTS 4,276,689  7/1981  Urick et al. ............................ 29/596
4,566,180  1/1986  Witwer et al. ......................... 29/596

Primary Examiner—Carl E. Hall

Attorney, Agent, or Firm—Sughrue, Mion, Zinn, Macpeak & Seas

[57]  ABSTRACT

A plurality of phase insulators are inserted in the cavities of the stator of a dynamo-electric machine by means of an insertion device which includes a plurality of guide blades displaced circumferentially around a central axis and an insertion member slidable between the series of guide blades and having a circumferential series of axial grooves in its outer surface in which the various blades are engaged. The insertion member is disposed initially in a rest position in which it allows a phase insulator to be positioned above the guide blades, after which it is moved to an operative position so as to cause the phase insulators to slide along the guide blades and to be inserted in the cavities of the stator. Before the phase insulators are disposed above the guide blades, at least some of them are moved from their normal operative positions to positions spaced radially towards the outside in which the arrangement of the phase insulators above the guide blades is particularly simple so as to enable this to be carried out by automatic assembly equipment as well.

5 Claims, 3 Drawing Sheets

DEVICE FOR INSERTING A PLURALITY OF PHASE INSULATORS IN THE CAVITIES OF THE STATOR OF A DYNAMO-ELECTRIC MACHINE

BACKGROUND OF THE INVENTION

The present invention relates to a method and to a device for the insertion of a plurality of phase insulators in the cavities of a stator of a dynamo-electric machine.

In the present description and in the following claims, the term "phase insulators" indicates the insulating elements which are used to separate various windings which are engaged in the same cavities of the stator of a dynamo-electric machine. One example of a phase insulator normally used in the art is illustrated in perspective in FIG. 1 of the appended drawings. The insulator is constituted by a sheet of insulating plastics material generally indicated 1 and comprising two end portions 2 and a plurality of bridges 3 which interconnect them and define windows 1a. FIG. 2 of the appended drawings illustrates in perspective a stator 4 of a dynamo-electric machine provided with a plurality of phase insulators 1 of the type illustrated in FIG. 1. The stator 4 has, in conventional manner, a structure constituted by a pack of laminations having a cylindrical central through aperture 5. A plurality of cavities 6 which are angularly spaced from each other open in the wall of the central aperture 5. Reference numeral 7 generally indicates a primary winding whose turns are inserted in some of the cavities 6 of the stator. A secondary winding (not illustrated) is inserted in the same cavities after the arrangement of phase insulators 1 in the latter. As shown in FIG. 2, the bridges 3 of each phase insulator 1 are inserted each in a corresponding cavity of the stator to separate the primary winding from the secondary winding, while the end portions 2 of each phase insulator 1 project from the ends of the stator and serve to insulate the corresponding parts of the windings.

It is already known in the art (see for example U.S. Pat. No. 4,276,689 and UK Pat. No. 1,445,728) to insert the phase insulators in the cavities of the stator with the aid of devices similar to those used for inserting the prewound coils of the winding in the cavities. More particularly, there is already known from each of the documents mentioned above, a device for inserting a plurality of phase insulators in the cavities of the stator of a dynamo-electric machine, which comprises:

a plurality of guide blades for inserting the phase insulators, disposed circumferentially around a central axis, and an insertion member which is slidable between the series of guide blades, having a circumferential series of axial grooves in its outer surface in which the various guide blades are engaged, this member being movable from a rest position, in which it allows a plurality of phase insulators to be pre-arranged on the guide blades, to an operative position to cause the phase insulators to slide over the guide blades and the subsequent insertion of these phase insulators within the cavities of a stator arranged at the end of the circumferential series of guide blades.

The prearrangement of the phase insulators above the guide blades so that they can subsequently be inserted in the cavities of the stator must be carried out by the insertion of the bridges 3 of each insulator 1 in the same number of longitudinal spaces defined between adjacent guide blades. With the prior-art devices, this operation had necessarily to be carried out manually to ensure that the insertion occurred correctly without causing deformation or folding of the insulators.

SUMMARY OF THE INVENTION

The object of the present invention is to provide a new method and corresponding device for the insertion of the phase insulators in the cavities of the stator which allows the phase insulators to be pre-arranged on the guide blades particularly simply, easily and reliably so as to allow this operation to be carried out even by automatic equipment if so desired.

In order to achieve this object, this invention provides a device of the type indicated above, characterized in that at least some of the guide blades are movable from their normal operative positions to positions spaced radially outwardly in which it is easy to position the phase insulators above them.

In one embodiment, the guide blades are articulated to a support structure at their ends opposite those on which the stator is placed, about an axis perpendicular to the axis of the circumferential series of guide blades so that each of these guide blades can pivot about its articulation axis between its operative position and its open position diverging outwardly.

The present invention also has as its subject a method which provides for the use of the device mentioned above, including the stage of pre-arranging the guide blades in their positions spaced radially outwardly relative to their normal operative positions, the stage of positioning a plurality of phase insulators on the guide blades so pre-arranged, he stage of returning the guide blades to their normal operative positions, and finally the stage of driving the movement of the insertion member to its operative position so as to cause the phase insulators to slide on the guide blades and their subsequent insertion in the cavities of a stator arranged in correspondence with the free ends of the circumferential series of guide blades.

By virtue of the characteristics indicated above, the present invention allows the phase insulators to be positioned above the guide blades even with automatic equipment. In fact, once the guide blades have been arranged in their positions spaced radially outwardly relative to their normal operative positions, the spaces defined between the adjacent blades are sufficiently wide to ensure that the phase insulators can be positioned without any danger of their deformation.

Contrary to what has been proposed in the prior-art documents cited above, in the present invention the insertion of the phase insulators is preferably carried out with a device dedicated solely to this operation, which is not used for the insertion of the prewound coils of a winding in the cavities of the stator at the same time as the phase insulators. It is possible, for example to provide automatic equipment which includes several machines in which the various successive stages of the manufacture are carried out, in particular, a first for the insertion of a first winding in the cavities of the stator, a second machine for the insertion of the phase insulators and a third machine for the insertion of a second winding in the cavities of the stator, the loading of the phase insulators onto the guide blades of the second being carried out by automatic equipment.

BRIEF DESCRIPTION OF THE DRAWINGS

Further characteristics and advantages of the invention will become apparent from the description which follows with reference to the appended drawings, provided purely by way of non-limiting example, in which.

DETAILED DESCRIPTION OF THE INVENTION

Figure 1:
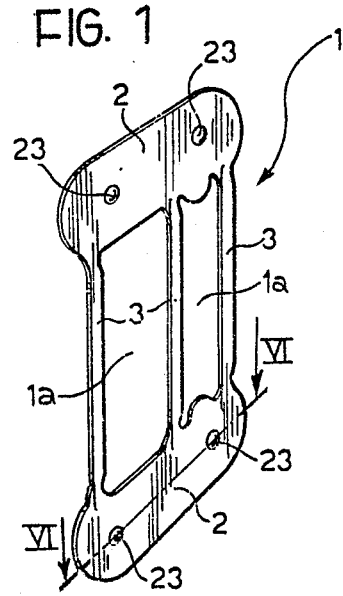
FIG. 1 is a perspective view of a phase insulator.
Figure 2:
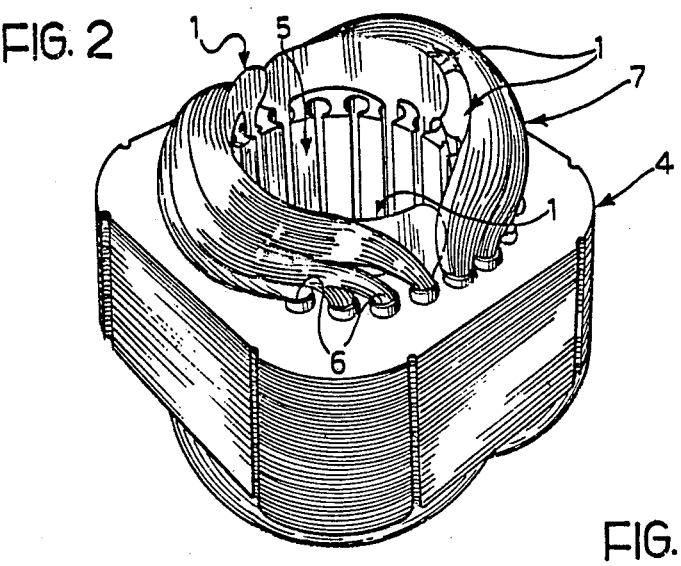
FIG. 2 is a perspective view of a stator of a dynamo-electric machine, with a winding and the phase insulators already inserted in the cavities.

FIGS. 1 and 2 of the appended drawings have already been described above.

Figure 5:
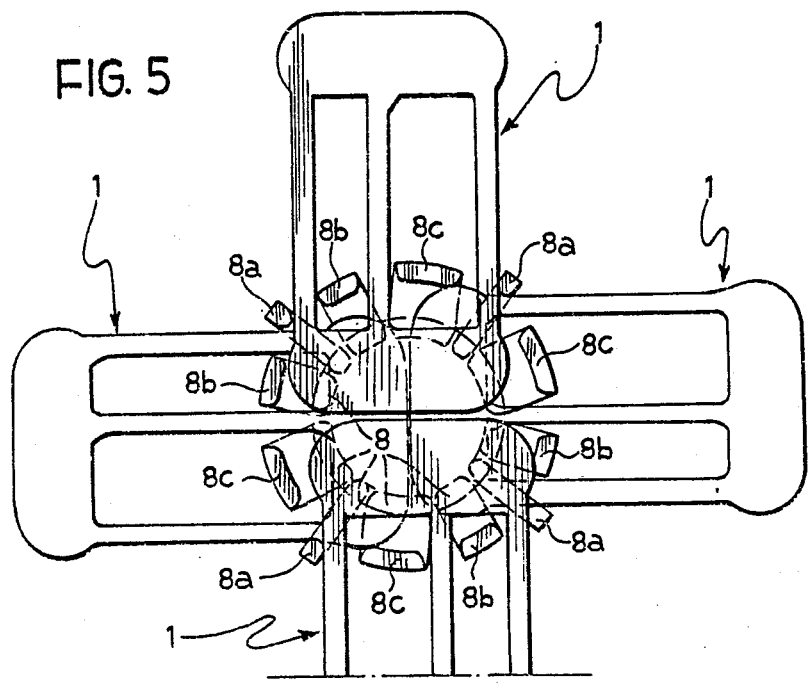
FIG. 5 is a schematic plan view taken on the arrow V of FIG. 4.
Figure 4:
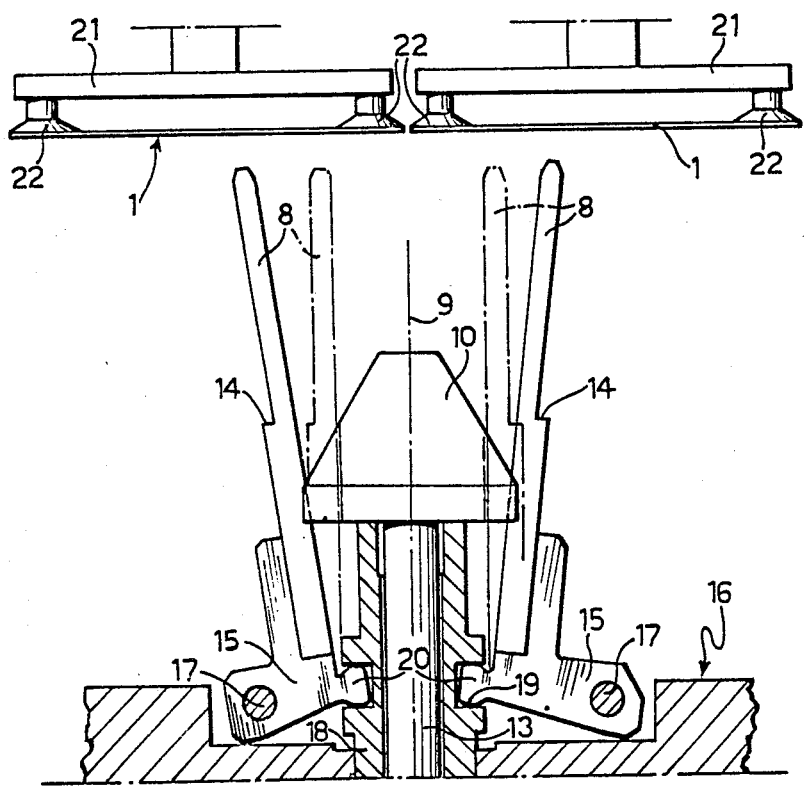
FIG. 4 is a cross-section of the device of the invention in a second operative position.
Figure 3:
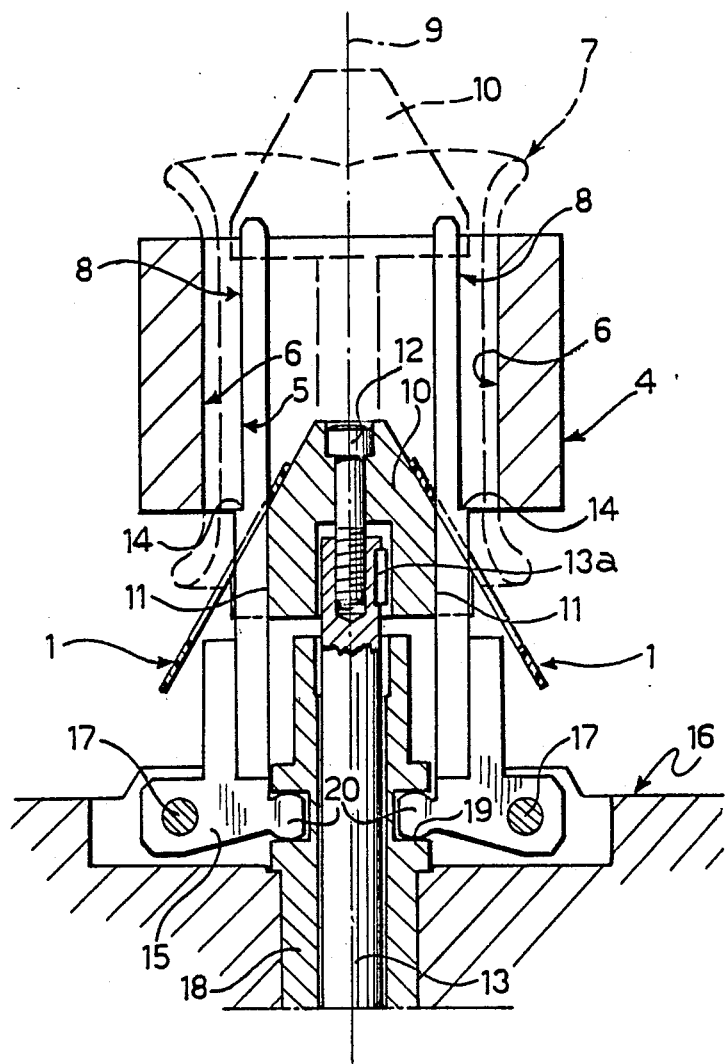
FIG. 3 is a schematic sectional view of a device according to the present invention in a first operative condition.

FIGS. 3 to 5 illustrate one embodiment of a device according to the invention. With reference to these drawings, the device for inserting the phase insulators comprises a plurality of fingers or guide blades 8 disposed circumferentially around a central axis 9 and extending parallel to this axis in their normal operative positions illustrated in FIG. 3. As shown in FIG. 5, in which the normal operative positions of the blades 8 are indicated in broken outline, the blades 8 are arranged circumferentially so as to leave longitudinal spaces between them. Still from FIG. 5, moreover, it is seen that the various blades 8 have different sectional dimensions and profiles for reasons which will be clarified below.

A substantially conical insertion member 10 is slidable within the circumferential series of guide blades 8 and has a circumferential series of axial grooves 11 in its outer surface which are slidably engaged by the various guide blades 8. The insertion member 10 is fixed by a screw 12 and a key 13a to a movable shaft 13 intended to be driven by actuator means of any known type (not illustrated) to cause the axial movement of the insertion member 10. On the upper end of the series of guide blades 8 (still see FIG. 3) there is fitted a stator 4 of the type illustrated in FIG. 2, having a laminated body with a central aperture 5 of circular section into which open a plurality of axial cavities 6. The coils 7 of a primary winding are already inserted in the cavities of the stator 6. The device illustrated is used to introduce a plurality of phase insulators 1 of the type illustrated in FIG. 1 into the cavities 6 before the stator is passed to another station where a subsequent winding is to be inserted. According to the conventional technique, the circumferential series of guide blades 8 is conformed in such a manner that the stator 4 may be fitted onto it and rests on it in such a manner that the longitudinal spaces between adjacent blades face corresponding cavities of the stator.

In the case illustrated, the stator 4 rests on shoulders 14 on the outer surfaces of the guide blades 8.

In order to cause the insertion of the phase insulators 1 into corresponding cavities 6 of the stator, the thrust member 10 is predisposed in a lowered rest position (illustrated in continuous outline in FIG. 3) so as to enable the insulators 1 to be fitted over the blades 8, resting on the upper conical surface of the thrust member 10. Each insulator is fitted onto the guide blades in such a manner that each of the blades concerned engages a corresponding window 1a in the phase insulator.

Once the phase insulators have been so arranged—by means of the technique which will be described in detail below—the thrust member 10 is moved to its operative position (illustrated in broken outline in FIG. 3) so as to cause the phase insulators 1 to slide over the guide blades 8 and to be inserted subsequently in the cavities 6 of the stator.

As already indicated in the introduction to the present specification, the known art provides for the manual arrangement of the phase insulators 1 above the guide blades 8. In all the known devices, the guide blades 8 are fixed rigidly in their normal operative positions (illustrated in broken outline in FIG. 5). It is clear from FIG. 5 that, in this condition, the insertion of the bridges 3 of each phase insulator 1 in a corresponding space between two adjacent blades 8 causes deformation of the insulator. In the prior art, it has thus been necessary to carry out the positioning of the phase insulators manually since only in this manner is it possible to ensure that the insulators are positioned correctly, avoiding the risk of problems in their subsequent insertion in the cavities of the stator.

In the device according to the invention, the guide blades or at least some of these may be displaced from their normal operative positions (illustrated in broken outline in FIG. 5) to positions spaced radially outwardly (illustrated in continuous outline in FIG. 5) so as to facilitate the positioning of the phase insulators 1. FIG. 5 illustrates in plan four phase insulators intended to be fitted onto the circumferential series of guide blades. As seen, when the blades are in their most open positions, spaced radially outwardly from their normal operative positions, the phase insulators may be positioned without interference with the blades and consequent deformation of the phase insulators. FIG. 5 also shows how the spacing of the open positions of the guide blades relative to the normal operative positions should preferably vary for the various guide blades in order to avoid interference with the insulators during positioning of the latter. For example, the blades indicated 8a in the embodiment illustrated in FIG. 5 must be spaced further outwardly from their normal operative positions in that otherwise these would interfere with the zone in which two adjacent insulators are to be superposed.

A further preferred characteristic of the invention lies in the fact that the insertion device described is used solely for the insertion of the phase insulators and not for the insulators together with the coils of a winding. The device illustrated is thus preferably dedicated solely to the operation of introducing the phase insulators into the cavities of the stator. As already stated, the sections of the various guide blades preferably differ in dependence on their use. For example, the blades indicated 8b and 8c in FIG. 5 have sections corresponding to the width of the respective windows 1a which are engaged thereby.

The movement of the guide blades 8 from their normal operative positions to their open positions spaced radially outwardly may be achieved in any manner.

In the embodiment illustrated, the lower ends of the guide blades 8 are fixed to levers 15 which are articulated to a support structure 16 about axes 17 perpendicular to the axis 9 of the circumferential series of guide blades. Hence, each blade may be pivoted about the axis 17 between the operative position illustrated in broken outline in FIG. 4 and an open position, diverging outwardly, illustrated in continuous outline in FIG. 4. The pivoting of the blades 8 may for example be controlled by a sleeve 18 slidable coaxially on the exterior of the shaft 13 and having a circumferential groove 19 which is engaged by projecting noses 20 of the levers 15.

In the device according to the invention, the loading of the phase insulators 1 onto the guide blades 8 may be effected by automatic equipment after the guide blades have been moved into their open positions. In this condition, the phase insulators 1 may be positioned by take-up members 21 provided with suction pads 22 (FIG. 4). Once the take-up members 21 have positioned the phase insulators 1 above the guide blades, these latter may be returned to their normal operative positions, after which the stator 4 is fitted and the insertion member 10 is brought into its operative position so as to cause the insertion of the insulators into the cavities of the stator.

Automatic equipment may thus be provided for inserting the windings and the phase insulators into the cavities of the stator, comprising a first machine including a device for inserting a first winding, a second machine in which the insertion of the phase insulators by means of the device according to the invention is carrie out completely automatically, and a third machine in which a further winding is inserted into the cavities of the stator.

Figure 6:
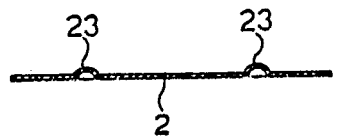
FIG. 6 is a cross-section taken on the line VI—VI of FIG. 1.

In the prior art, the bridges 3 of each phase insulator sometimes have a line of longitudinal folding to facilitate their insertion in the corresponding spaces between the guide blades. In the case of the present invention, these folds are no longer necessary since the positioning of the phase insulators may be carried out easily after the guide blades have been arranged in their open positions. In the absence of these fold lines, it is however advantageous in the case of the present invention to provide the phase insulators with bosses 23 (see FIGS. 1, 6) which act as spacer elements between adjacent insulators when the latter are stacked waiting to be taken up to be positioned. This avoids the risk of the suction take-up members 21 being able to lift several insulators at a time as a result of the static charge which the insulators tend to have.

Naturally, the principle of the invention remaining the same, the constructional details and forms of embodiment may be varied widely with respect to that described and illustrated purely by way of example, without thereby departing from the scope of the present invention.

For example, the blades 8 may have—in known manner—longitudinal lips on their outer surfaces for engaging the sides of the cavities of the stator. Obviously, moreover, the insulators may also have shapes different from that illustrated in the appended drawings. Finally, means—of known type—may be provided for ensuring the correct angular positioning of the stator on the blades.

I claim:

1. A device for inserting a plurality of phase insulators (1) in the cavities (6) of the stator (4) of a dynamo-electric machine, the device comprising:
    a plurality of guide blades (8) for the insertion of the phase insulators, disposed circumferentially around a central axis (9),
    an insertion member (10) slidable within the series of guide blades (8), having a circumferential series of axial grooves (11) in its outer surface in which the various guide blades (8) are engaged, this member being movable from a rest position, in which the phase insulators (1) may be positioned above the guide blades (8), to an operative position so as to cause the phase subsequently to be inserted in the cavities (6) of a stator (4) arranged in correspondence with the end of the series of guide blades (8), characterized in that at least some of the guide blades are movable and means for moving said guide blades are provided for moving said guide blades from their normal operative positions to open positions spaced radially outwardly, in which it is possible to position the phase insulators (1) above the guide blades (8) easily.

2. A device according to claim 1, characterized in that the spacing of the open positions of the guide blades (8) relative to their normal operative positions differs for different guide blades (8).

3. A device according to claim 1, characterized in that the guide blades (8) are articulated at their ends opposite ;those on which the stator (4) is fitted to a support structure (16) about an axis (17) perpendicular to the axis (9) of the circumferential series of guide blades, so that each blade can pivot about its articulation axis (17) between a normal operative position and an open position diverging outwardly.

4. A device according to claim 3, characterized in that the guide blades (8) have projecting noses (20) which engage a circumferential groove (19) in a sleeve (18) slidable axially for moving the guide blades between their normal operative positions and their open positions.

5. A device according to claim 1, characterized in that the guide blades have different cross-sectional dimensions and shapes.

* * * * *